United States Patent [19]
Gerety

[11] Patent Number: 5,745,658
[45] Date of Patent: Apr. 28, 1998

[54] METHOD OF ALIGNING ONE DIMENSIONAL OR TWO DIMENSIONAL CODES TO PRINTER PIXELS

[75] Inventor: Eugene P. Gerety, Seymour, Conn.

[73] Assignee: Datastrip Products Inc., Waterbury, Conn.

[21] Appl. No.: 558,421

[22] Filed: Nov. 16, 1995

[51] Int. Cl.$^6$ .................................................. G06K 15/00
[52] U.S. Cl. ........................................ 395/102; 395/106
[58] Field of Search ................................. 395/102, 110, 395/117, 105, 106, 112, 114, 128, 137, 138, 139, 167, 168, 170, 171, 172; 382/293, 294, 295, 296–301; 345/128, 127, 132; 400/61–63, 70, 74, 76

[56] References Cited

U.S. PATENT DOCUMENTS

| | | | |
|---|---|---|---|
| 5,299,294 | 3/1994 | McCracken et al. | 395/110 |
| 5,459,828 | 10/1995 | Zack et al. | 395/151 |

*Primary Examiner*—Arthur G. Evans
*Attorney, Agent, or Firm*—Kalow Springut & Bressler

[57] ABSTRACT

A printer processor in which accuracy of a printed image is essential. The printer processor receives exact pixel characteristics from a target printer, and instructs the target printer to exactly reproduce the desired image after eliminating any distortions introduced by scaling or rotational factors.

9 Claims, 5 Drawing Sheets

```
1 1 1 0 0 0 1 1 1 0 0 0 1 1 1 0 0 0 1 1 1 0 0 0
1 1 1 0 0 0 1 1 1 0 0 0 1 1 1 0 0 0 1 1 1 0 0 0
1 1 1 0 0 0 1 1 1 0 0 0 1 1 1 0 0 0 1 1 1 0 0 0
0 0 0 1 1 1 0 0 0 1 1 1 0 0 0 1 1 1 0 0 0 1 1 1
0 0 0 1 1 1 0 0 0 1 1 1 0 0 0 1 1 1 0 0 0 1 1 1
0 0 0 1 1 1 0 0 0 1 1 1 0 0 0 1 1 1 0 0 0 1 1 1
1 1 1 0 0 0 1 1 1 0 0 0 1 1 1 0 0 0 1 1 1 0 0 0
1 1 1 0 0 0 1 1 1 0 0 0 1 1 1 0 0 0 1 1 1 0 0 0
1 1 1 0 0 0 1 1 1 0 0 0 1 1 1 0 0 0 1 1 1 0 0 0
0 0 0 1 1 1 0 0 0 1 1 1 0 0 0 1 1 1 0 0 0 1 1 1
0 0 0 1 1 1 0 0 0 1 1 1 0 0 0 1 1 1 0 0 0 1 1 1
0 0 0 1 1 1 0 0 0 1 1 1 0 0 0 1 1 1 0 0 0 1 1 1
```

```
1 1 1 0 0 0 1 1 1 0 0 0 0 1 1 1 0 0 0 1 1 1 1 0 0 0
1 1 1 0 0 0 1 1 1 0 0 0 0 1 1 1 0 0 0 1 1 1 1 0 0 0
1 1 1 0 0 0 1 1 1 0 0 0 0 1 1 1 0 0 0 1 1 1 1 0 0 0
0 0 0 1 1 1 0 0 0 1 1 1 1 0 0 0 1 1 1 0 0 0 0 1 1 1
0 0 0 1 1 1 0 0 0 1 1 1 1 0 0 0 1 1 1 0 0 0 0 1 1 1
0 0 0 1 1 1 0 0 0 1 1 1 1 0 0 0 1 1 1 0 0 0 0 1 1 1
1 1 1 0 0 0 1 1 1 0 0 0 0 1 1 1 0 0 0 1 1 1 1 0 0 0
1 1 1 0 0 0 1 1 1 0 0 0 0 1 1 1 0 0 0 1 1 1 1 0 0 0
1 1 1 0 0 0 1 1 1 0 0 0 0 1 1 1 0 0 0 1 1 1 1 0 0 0
0 0 0 1 1 1 0 0 0 1 1 1 1 0 0 0 1 1 1 0 0 0 0 1 1 1
0 0 0 1 1 1 0 0 0 1 1 1 1 0 0 0 1 1 1 0 0 0 0 1 1 1
0 0 0 1 1 1 0 0 0 1 1 1 1 0 0 0 1 1 1 0 0 0 0 1 1 1
0 0 0 1 1 1 0 0 0 1 1 1 1 0 0 0 1 1 1 0 0 0 0 1 1 1
```

METHOD OF ALIGNING ONE DIMENSIONAL OR TWO DIMENSIONAL CODES TO PRINTER PIXELS

FIELD OF THE INVENTION

This invention relates to precise printing of one dimensional and two dimensional codes used for identification purposes and, more particularly, to a method for compensating and correcting for geometric distortions introduced by printers to ensure that the printed codes are accurate and machine readable.

BACKGROUND OF THE INVENTION

Identification codes, such as one dimensional codes (Bar codes), and two dimensional codes (Datastrip codes), are widely used for purposes of identifying items, products, and/or individuals, as the codes are read by intelligent machines. However, such machine readable codes must be printed very accurately in order to ensure that the code(s) are uniformly and accurately read by the intelligent machine(s). Even small errors in the printing process can result in a code that is unreadable by a particular machine, thus making the coding process unusable for its intended purpose.

For example, two dimensional codes (2D codes), such as utilized by Datastrip Products Inc., must generally be precisely aligned to a particular printer's pixel array when printing the code to avoid geometric distortion of the code bitmap. The geometric distortions result from small scale factors applied in the horizontal and vertical dimensions by some printer drivers and printing applications (such as Windows print drivers, and Windows graphics applications). Slight scaling (e.g., 99.5% to 100.5%) is not uncommon in the bitmap printed from Windows. The scale factors cause the code bitmap to be expanded or shrunk by replicating or deleting rows and/or columns of dots in the bitmap. This destroys low-level, localized, geometric characteristics of such codes, making them harder to read, less reliable and possibly rendering the codes unreadable.

A significant problem with printing bitmap images using commercially available software in device-independent operating environments such as Microsoft Windows (™) is that slight scale and/or rotation factors are often applied to the printed output produced by this software. For most word processing and illustration purposes, these scale and/or rotation factors are unnoticeable. However, when attempting to print bitmap images of encoded data which require accurate geometric characteristics, the pixel shifts, and added or dropped rows of pixels distributed throughout the printed image as a result of slight scaling or rotation, can produce significant geometric distortions.

An example of attempts to correct for printer scale and/or rotation factors in word processing applications is shown in U.S. Pat. No. 5,459,828, granted to Zack, et al on Oct. 17, 1995. This patent teaches a method of producing a raster font from a contour font entailing the steps of deriving font metrics and character metrics of font characters in terms of arbitrary font units, scaling the font characters to a selected size and output resolution and altering the thickness of vertical and horizontal strokes of each character to a desired thickness. In essence, the thrust of the invention in the Zack et al patent is to modify the appearance of a particular character in order to make the character appear uniform to a reader.

In contrast, it is the object of the instant invention to very accurately print a particular machine readable code by correcting and compensating for distortions introduced by various printing machines.

Hereinafter, the term "interpretive printer" will be used to refer to a printer which executes a page description language within the printer itself, and the term "non-interpretive" printer will be used to describe a printer which merely prints an externally created image. An example of an interpretive printer is a Postscript (™) printer (Postscript is a registered trademark of Adobe Systems, Inc.), such as the Apple Laserwriter, produced by Apple Computer, Inc., which executes a Postscript language interpreter within the printer. Page descriptions sent to the printer are actually Postscript language programs which, when interpreted by the language interpreter in the printer, causes an image to be printed by the printer. An example of a non-interpretive printer is the Hewlett Packard Laserjet Series IV, produced by Hewlett Packard, Inc.

SUMMARY OF INVENTION

The present invention provides techniques for printing bitmap images of encoded data using standard, commercially available application software such as drawing programs or word processing programs, such that the bitmap images are exactly registered to a target printer's pixel grid independent of any rotation or scaling which may have been applied by the application software. Hereinafter, such bitmap image s will be referred to as having been "pixel-registered" with respect to the target printer.

It is a feature of the invention that predetermined images to be printed are scaled to fit a predetermined number of pixels as identified by the particular printer being used.

It is a further feature of the invention that the resolution of the target printer is known before transmitting the image to the target printer, and compensation is applied to correct for printer induced scaling and rotation factors.

These and other aspects of the invention will become apparent from the following description used to illustrate a preferred embodiment of the invention in conjunction with the accompanying drawings in which:

DETAILED DESCRIPTION OF THE INVENTION

Figures 1A, 1B:
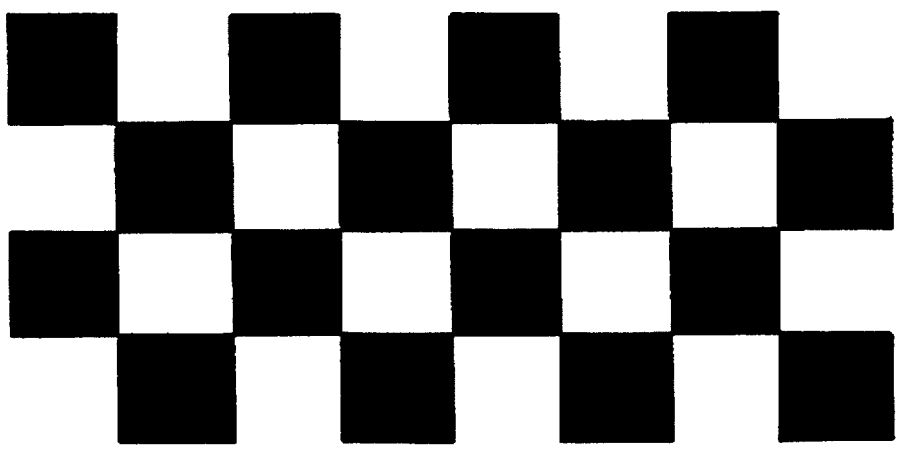
FIGS. 1A–1D illustrate the effect of scaling on a bitmap in accordance with the invention.

Referring now to FIGS. 1A–1D, FIG. 1A illustrates the bitmap for a particular two dimensional code, and FIG. 1B illustrates how that code should appear when printed. As shown, the bitmap in FIG. 1A consists of a plurality of 3×3 arrays, where an array of all "1" bits results in a black square being printed, while an array of all "0" bits results in a white square, i.e., no printing in this area.

Figures 1C, 1D:
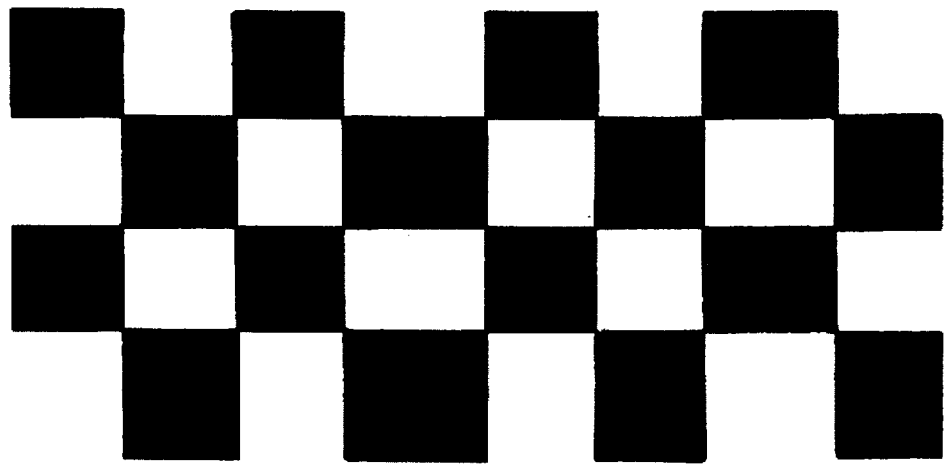

In contrast, FIG. 1C illustrates a bitmap after scaling by application software located in the CPU or in the printer. Note how the bitmap has been distorted, which results in the printed image shown in FIG. 1D. These distortions can render the printer image unreadable by a machine, which is the problem solved by the instant invention.

Figure 2:
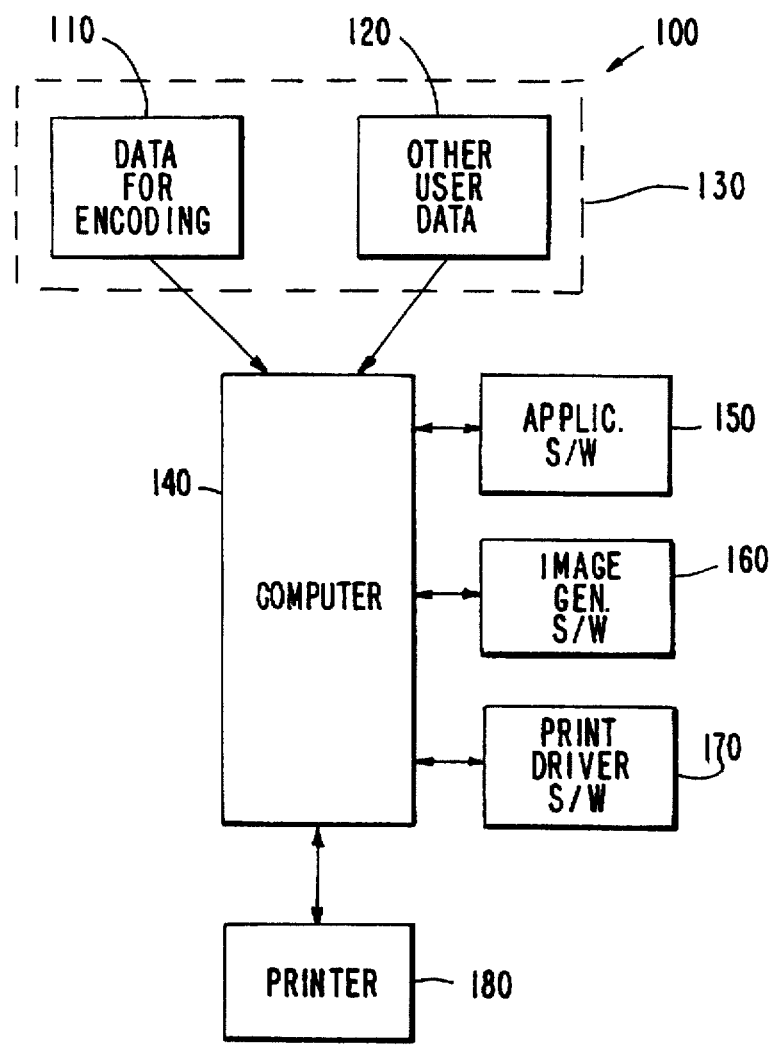
FIG. 2 is a block diagram of a computer-based system for printing pixel-registered bitmap images of encoded data on a printer according to the invention.

FIG. 2 shows a computer based system 100 for printing pixel-registered bitmap images, which includes a computer 140, application software 150 on the computer 140, image generation software 160 on the computer 140, print driver software 170 on the computer 140, and a printer 180. A user provides data for encoding 110 to be encoded into a bitmap image via the image generation software 160. Other user data 120 may be provided in combination with the data for encoding 110 for processing by the application software 150. Print driver software 150 controls the flow and formatting of data generated by the image generation software 160, and the application software 160 to the printer 180. The user data 110, and other user data will usually reside on a storage device 130 connected to the computer 140.

Typically, a user will use the application software 160 (such as a word processor or drawing program) to process other user data 120. The result of this processing is a printed page. After processing of the data for encoding 110 by the image generation software, the user can combine the resultant image with the other user data 120, using an import facility of the application software. (Such import facilities are widely known to and understood by those of ordinary skill in the art, and will not be further elaborated upon herein). The combined output is then sent by the application software 150 via the print driver software 170 to the printer 180.

Figure 3:
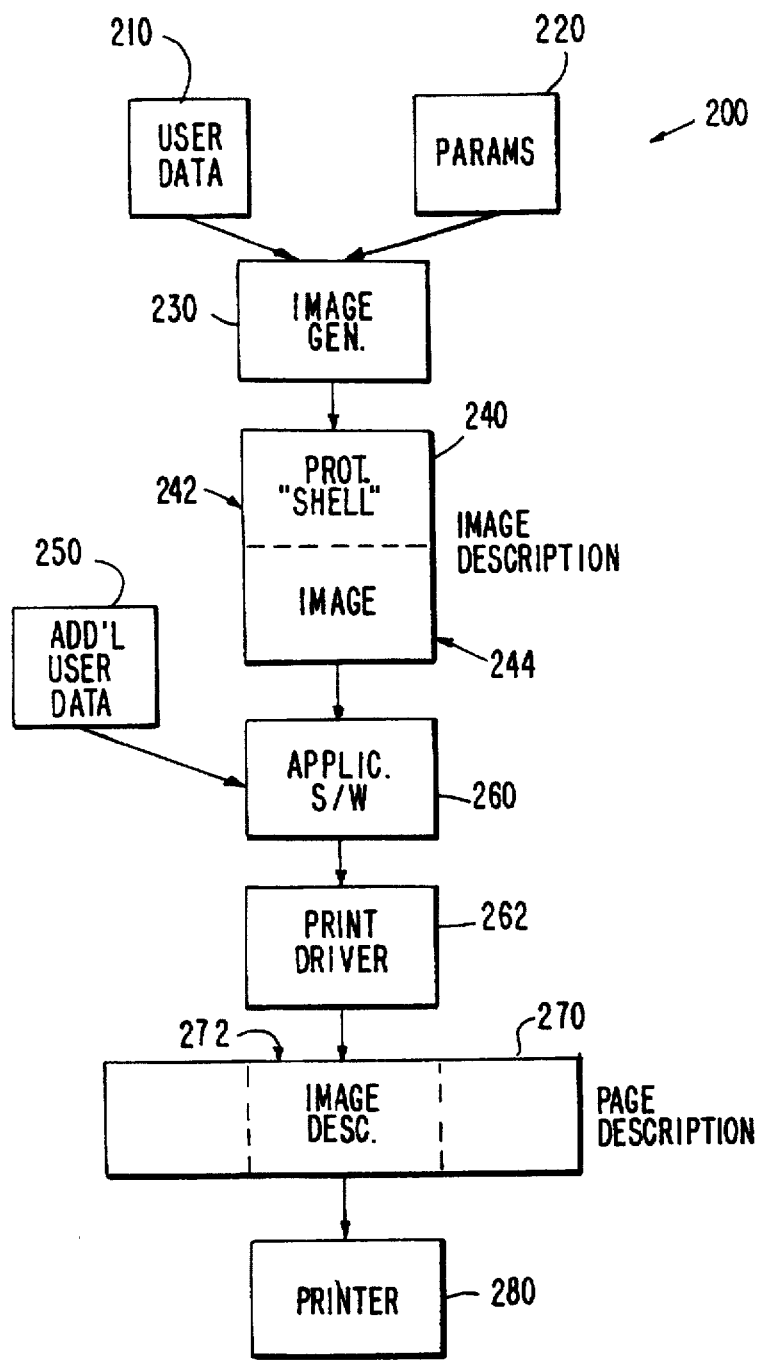
FIG. 3 is a flow diagram showing processes and data flow for a method of printing pixel-registered bitmap images of encoded data on an interpretive printer according to the invention.

FIG. 3 is a flow diagram 200, showing processes and data flow for a method of printing pixel-registered bitmap images on an interpretive printer. User data 210, provided by a user for encoding into a bitmap image, is encoded by an image generation process 230 according to a set of parameters (e.g., intended printer dot-per-inch rating, size and shape for image features, etc.). The image generation process 230 produces an image description 240 comprising a protective image shell 242, and an image portion 244. The protective image shell 242 is essentially a program in a page description language capable of being interpreted by an interpretive printer 280, for analyzing the printer's physical pixel array characteristics, and resizing and reorienting the image portion 244, as necessary to align exactly with an integer multiple of the printer's pixel resoluting. That is, if the printer is a 300 dpi (dot per inch) printer, but has had a non-integer scale factor applied by an application program (e.g., 205%), then the protective image shell will detect the scaling and cause the image to be printed at the nearest integer scale factor (e.g., 200%), which does not shrink the image 244. The protective image shell 242 performs similarly with rotation factors, causing the image 244 to be printed at only integer multiples of 90 degrees. Application software 260 processes additional user data 250, and imports the image description 240 for inclusion into printed output. Output from the application software 260 output is passed to a print driver which formats it into a page description 270 for a printer. A duplicate image description 272, substantially identical to the image description (240 above) is incorporated into the page description 270. The page description 270 is essentially a program to be executed by a page description language interpreter resident in the interpretive printer 280 to produce printed output.

Figure 4:
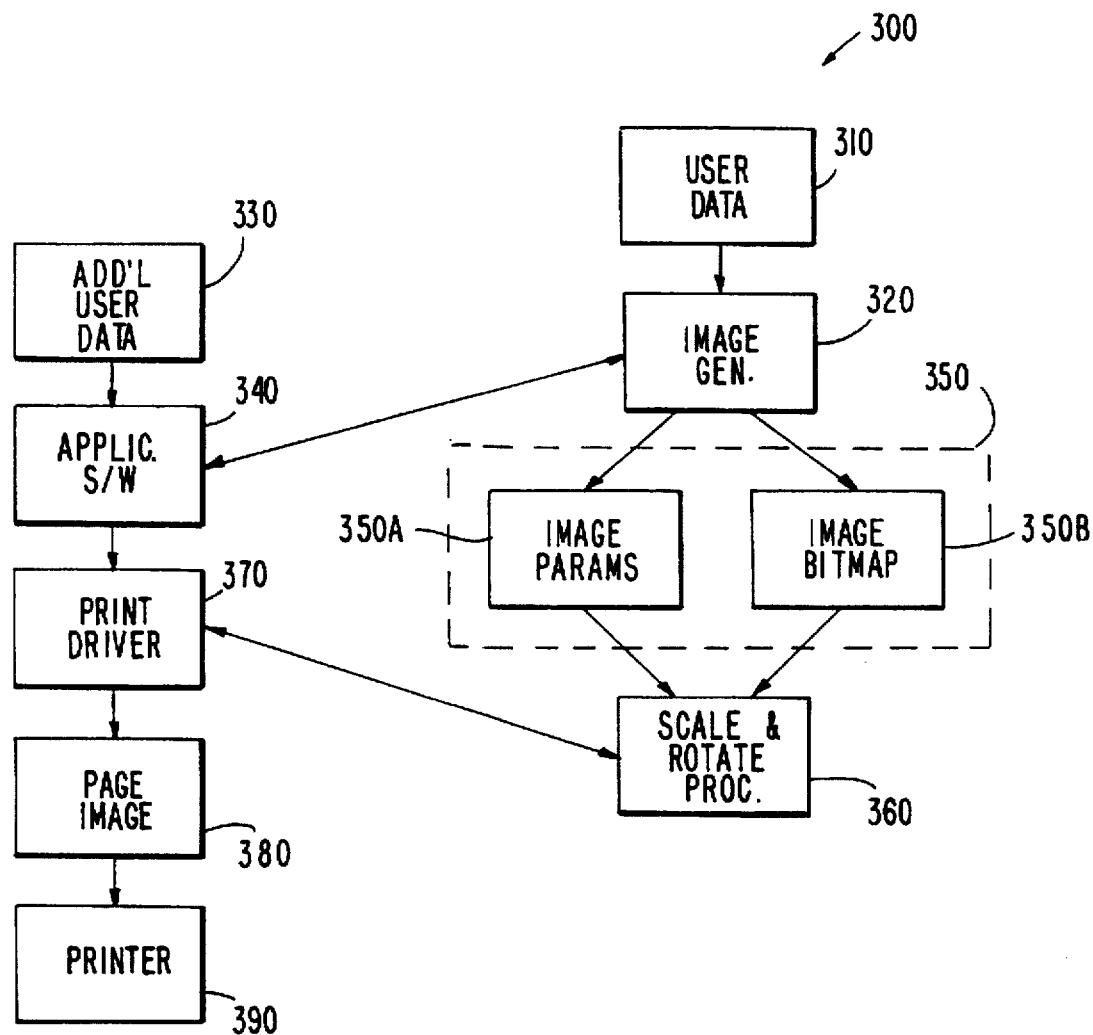
FIG. 4 is a flow diagram showing processes and data flow for a method of printing pixel-registered bitmap images of encoded data on a non-interpretive printer according to the invention.

FIG. 4 is a flow diagram 300 showing process and data flow for a method of printing pixel-registered bitmap images of encoded data on a non-interpretive printer 390. User data 310 is provided by a user for encoding into a bitmap image by image generation software 320. Additional user data 330 is provided by the user for processing by application software 340, such as a word processing program or a drawing program, to produce printed output on the non-interpretive printer 390. The image generation program 320 creates an image description 350 comprising a set of image parameters 350A (e.g., intended size of the image pixels, orientation, etc.), and an image bitmap 350B representing an encoding of the user data 310. The application software 340 treats the image generation program 320 as in import filter for incorporating the user data 310 in bitmap encoded form into its printed output. However, in this case, the image description 350 produced by the image generation program 320 (acting as an import filter for the application software 340), is passed to a print driver 370 by a scale and rotate process 360, which performs much the same function as described hereinabove with respect to FIG. 2 for the protective image shell 242. The scale and rotate process 360 queries the print driver 370 about physical printer characteristics and about print scaling and rotation setting made by the application software 340, and temporarily bypasses the settings made by the application software 340. The scale and rotate process then picks the nearest integer multiple of scaling to the scale setting made by the application software 360, at which the image bitmap 350B aligns exactly with a pixel resolution for the printer 390, and picks the nearest multiple of 90 degrees rotation to the rotation setting made by the application software 340, and sends the image bitmap to the print driver 370 at that setting. After sending the image bitmap 350B to the print driver 370, the scale and rotation settings made by the application software are restored. The print driver 370 produces a page image 380 formatted for printing by the non-interpretive printer 390.

The methods shown and described hereinabove with respect to FIGS. 3 and 4, produce substantially identical end results. The primary difference between the methods, is that the method of FIG. 3 performs image registration by appending a registration program to the image description for execution within an interpretive printer by a page description language interpreter, while the method of FIG. 4 performs the registration process inside the computer (e.g., 140, FIG. 2) prior to transmission to the printer.

A specific example of Postscript code for the protective image shell is set forth below. More particularly, the basic scheme of the following code is broken into two parts. The first part tests the printer's resolution and determines some basic parameters about the currently selected print coordinate system, determining whether or no there has been unacceptable rotation or shearing of the coordinate system. If there has, the first part "crashes" (stops), causing a second error printout part of the code to execute (via the "stopped" directive between the two portions). The error printout part prints an image resembling the shape and orientation that the image would have had if it had been printed in the current coordinate system (but does not print the actual strip), and dumps a list of relevant values determined by the first part.

The first part of the code uses a progress variable (Progress) to indicate where a failure has occurred. If the progress variable is equal to 6, then there is no error. If it is less than 6, then its value indicates how far the first part of the code got before detecting a problem.

Explanatory notes are embedded in the code below in the form of Postscript comments, which begin with a percent (%) sign.

It will be appreciated that changes and modifications are likely to occur to those skilled in the art, and it is intended in the appended claims to cover all those changes and modifications which fall within the spirit and scope of the present invention.

What is claimed is:

1. A printer processor implemented method for printing machine-readable code images on a selected printer having reproduction characteristics known and available, each machine-readable code image being defined by a code bitmap and having rectilinear areal geometric characteristics, the method including the steps of:

introducing a code bitmap of a machine-readable code image to be printed into a printer output image bitmap by means of software which imposes a risk of inducing image bitmap distortion;

obtaining for the printer processor the known reproduction characteristics of said selected printer;

analyzing, by said printer processor, physical pixel array characteristics of said printer based on said known reproduction characteristics;

transforming the code bitmap of the machine-readable code image in the printer output image bitmap to resize and rotate the code image as required to align essentially exactly rectilinear areal geometric characteristics of the code image with integer multiples of said printer's physical pixel array characteristics; and printing on the selected printer the code image defined by the transformed code bitmap in the printer output image bitmap.

2. A method according to claim 1, further comprising the step of:

after the step of analyzing physical pixel array characteristics of the printer and before printing the code image on the printer, transforming the code bitmap of the machine-readable code image in the printer output image bitmap to shear correct the code image as required to align essentially exactly rectilinear areal geometric characteristics of the code image with integer multiples of said printer's physical pixel array characteristics.

3. A printer processor implemented method for printing machine-readable code images on a selected printer having reproduction characteristics known and available, each machine-readable code image being defined by a code bitmap and having rectilinear areal geometric characteristics, the method including the steps of:

introducing a code bitmap of a machine-readable code image to be printed into a printer output image bitmap by means of software which imposes a risk of inducing image bitmap distortion;

obtaining for the printer processor the known reproduction characteristics of said selected printer;

analyzing, by said printer processor, physical pixel array characteristics of said printer based on said known reproduction characteristics;

transforming the code bitmap of the machine-readable code image in the printer output image bitmap to resize and reposition the code image as required to align essentially exactly rectilinear areal geometric characteristics of the code image with integer multiples of said printer's physical pixel array characteristics; and printing on the selected printer the code image defined by the transformed code bitmap in the printer output image bitmap.

4. A method according to claim 3, further comprising the step of:

after the step of analyzing physical pixel array characteristics of the printer and before printing the code image on the printer, transforming the code bitmap of the machine-readable code image in the printer output image bitmap to rotate the code image as required to align essentially exactly rectilinear areal geometric characteristics of the code image with said printer's pixel array characteristics.

5. A method according to claim 3, further comprising the step of:

after the step of analyzing physical pixel array characteristics of the printer and before printing the code image on the printer, transforming the code bitmap of the machine-readable code image in the printer output image bitmap to shear correct the code image as required to align essentially exactly rectilinear areal geometric characteristics of the code image with integer multiples of said printer's physical pixel array characteristics.

6. A printer processor implemented method for printing machine-readable code images on a selected printer having reproduction characteristics known and available, each machine-readable code image being defined by a code bitmap and having rectilinear areal geometric characteristics, the method including the steps of:

introducing a code bitmap of a machine-readable code image to be printed into a printer output image bitmap by means of software which imposes a risk of inducing image bitmap distortion;

obtaining for the printer processor the known reproduction characteristics of said selected printer;

analyzing, by said printer processor, physical pixel array characteristics of said printer based on said known reproduction characteristics;

measuring a rotational difference between a pixel array defined by the code bitmap of the machine-readable code image in the printer output image bitmap and said printer's physical pixel array characteristics;

comparing the magnitude of said rotational difference with zero and with a predetermined maximum acceptable rotational difference value; and:

(i) if the magnitude of the rotational difference is greater than zero and does not exceed said maximum acceptable rotational difference value, transforming the code bitmap of the machine-readable code image in the printer output image bitmap to essentially eliminate said rotational difference to align essentially exactly rectilinear areal geometric characteristics of the code image with said printer's physical pixel array characteristics, and printing on the selected printer the code image defined by the transformed code bitmap in the printer output image bitmap; or (ii) if the magnitude of said rotational difference exceeds said maximum acceptable rotational difference value, printing an error-indicating communication.

7. A method according to claim 6 in which the error-indicating communication is an error-indicating graphics image.

8. A printer processor implemented method for printing machine-readable code images on a selected printer having reproduction characteristics known and available, each machine-readable code image being defined by a code bitmap and having rectilinear areal geometric characteristics, the method including the steps of:

introducing a code bitmap of a machine-readable code image to be printed into a printer output image bitmap by means of software which imposes a risk of inducing image bitmap distortion;

obtaining for the printer processor the known reproduction characteristics of said selected printer;

analyzing, by said printer processor, physical pixel array characteristics of said printer based on said known reproduction characteristics;

measuring shear distortion between the pixel array defined by the code bitmap of the machine-readable code image in the printer output image bitmap and said printer's physical pixel array characteristics to determine a shear error amount;

comparing the magnitude of said shear error amount with zero and with a predetermined maximum acceptable shear error amount value; and, (i) if the magnitude of the shear error amount is greater than zero and does not exceed said maximum acceptable shear error amount value, transforming the code bitmap of the machine-readable code image in the printer output image bitmap to essentially eliminate said shear distortion to align essentially exactly rectilinear areal geometric characteristics of the code image with said printer's pixel array characteristics, and printing on the selected printer the code image defined by the transformed code bitmap in the printer output image bitmap; or (ii) if the magnitude of said shear error amount exceeds said maximum acceptable shear error amount value, printing an error-indicating communication.

9. A method according to claim 8 in which the error-indicating communication is an error-indicating graphics image.

* * * * *